Figure 1:
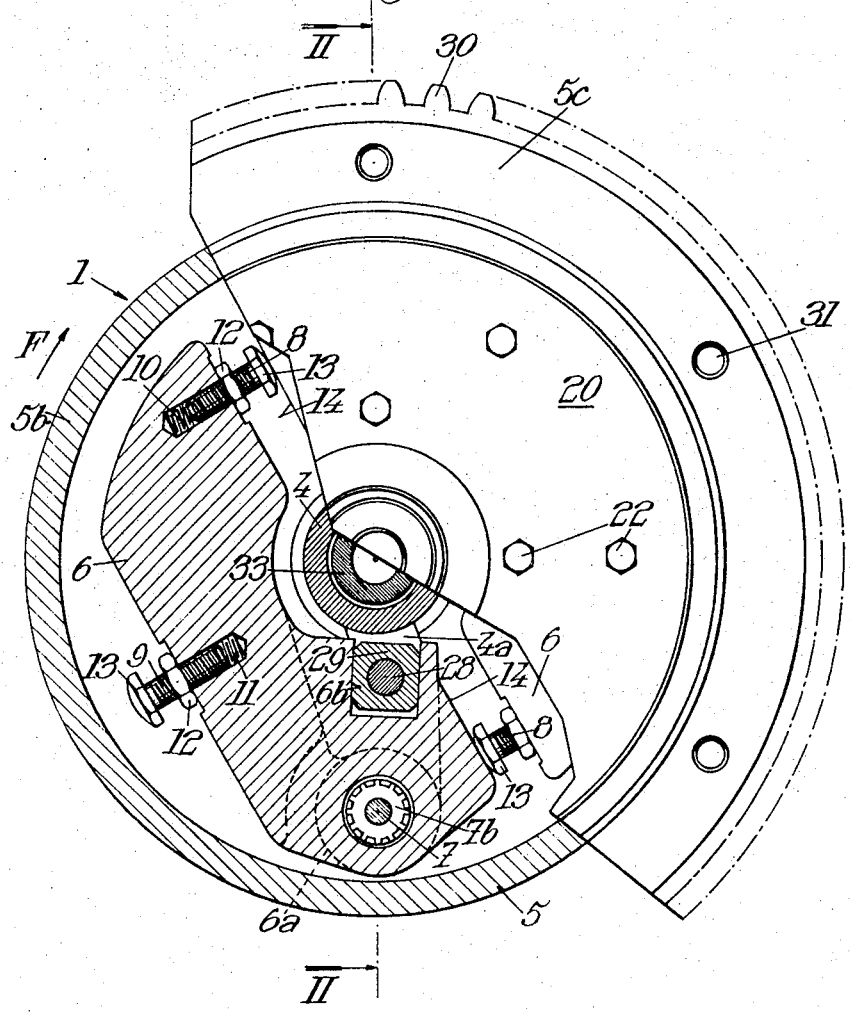

United States Patent [19]
Vuaille

[11] 3,728,870
[45] Apr. 24, 1973

[54] PROGRESSIVELY ACTING CENTRIFUGAL REGULATORS

[75] Inventor: Andre Vuaille, Lyon, France

[73] Assignee: Societe Industrielle Generale des Mecanique Appliquee S.I.G.M.A., Paris, France

[22] Filed: Feb. 16, 1971

[21] Appl. No.: 115,431

[30] Foreign Application Priority Data

Feb. 16, 1970 France..................................7005433

[52] U.S. Cl..................................64/25, 123/139.13
[51] Int. Cl...................................F16d 5/00
[58] Field of Search ......................64/25; 123/139.13

[56] References Cited

UNITED STATES PATENTS

| | | |
|---|---|---|
| 1,590,772 | 6/1926 | Moore......................................64/25 |
| 3,552,146 | 1/1971 | Pischinger et al.........................64/25 |
| 2,665,569 | 1/1954 | Ens............................................64/25 |
| 1,830,704 | 11/1931 | Chapelle..................................64/25 |
| 2,929,371 | 3/1960 | Rank.................................123/139.13 |

Primary Examiner—Edward G. Favors
Attorney—Waters, Roditi, Schwartz & Nissen

[57] ABSTRACT

The device is for insertion between a driven rotary member and a coaxial drive rotary member for progressively varying the angular position between them as a function of the speed of the drive member. The device is useful for regulating the injection lead angle for Diesel engines. The regulator is a self-contained assembly containing centrifugally-acting weights and torsion bars which are pre-set by screw stops enabling the limiting angular positions of the weights to be adjusted and consequently the minimal speed at which the regulator comes into play and the amplitude of the relative angular displacement between the driving and driven members.

6 Claims, 2 Drawing Figures

PROGRESSIVELY ACTING CENTRIFUGAL REGULATORS

The invention relates to centrifugal regulators adapted to cause the angular position of a driven rotary member to vary progressively, with respect to a coaxial drive rotary member, as a function of the rotary speed of the latter member and whose weights are arranged to turn on the drive rotary member around axes parallel to the axis of rotation of the regulator and are provided with individual return springs. The invention relates more particularly, among these regulators, to those which are for insertion in order to modify the mutual angular relationship as a function of the speed, between the crankshaft of a Diesel engine (to which the drive rotary member is connected) and the cam-shaft of the injection pump supplying this engine (shaft connected to the driven rotary member).

It is an object of the invention to enable accurate adjustment of the minimal speed at which the regulator comes into play and of the amplitude of the maximal relative angular displacement between the two abovesaid rotary members, i.e., in particular of the amplitude of the variation of the injection timing.

The regulator according to the invention may comprise screw stop means enabling the limiting angular positions of each of the weights to be adjusted. Preferably, these means are constituted by two screws borne by each weight and adapted to limit the angular movement of the latter respectively towards the axis of rotation of the regulator and away from this axis. Preferably again, the screw borne by one weight for limiting its angular movement towards the axis of rotation of the regulator cooperates by abutment with the neighboring weight.

It is another object of the invention to render the regulator such that the return springs of the weights work with the minimum of friction.

To this end, the regulator according to the invention is characterized by the fact that the return spring of each weight is constituted by a torsion bar aligned with the axis of rotation of this weight and anchored by one end to the latter and by the other end to the drive rotary member.

It is yet another object of the invention, to facilitate the maintenance of the regulator and to increase its life.

To this end, the regulator according to the invention is also characterized by the fact that the drive rotary member forms part of a casing enclosing the driven rotary member which is constituted by a central hub passing to the outside of this casing through rotary sealing joints, the regulator thus forming a self-contained assembly and being adapted to be greased during its assembling.

The invention will, in any case, be more fully understood with the aid of the supplementary description which follows as well as of the accompanying drawings, which supplement and drawings relate to a preferred embodiment of the invention, given of course purely by way of illustrative but non-limiting example.

Figure 2:
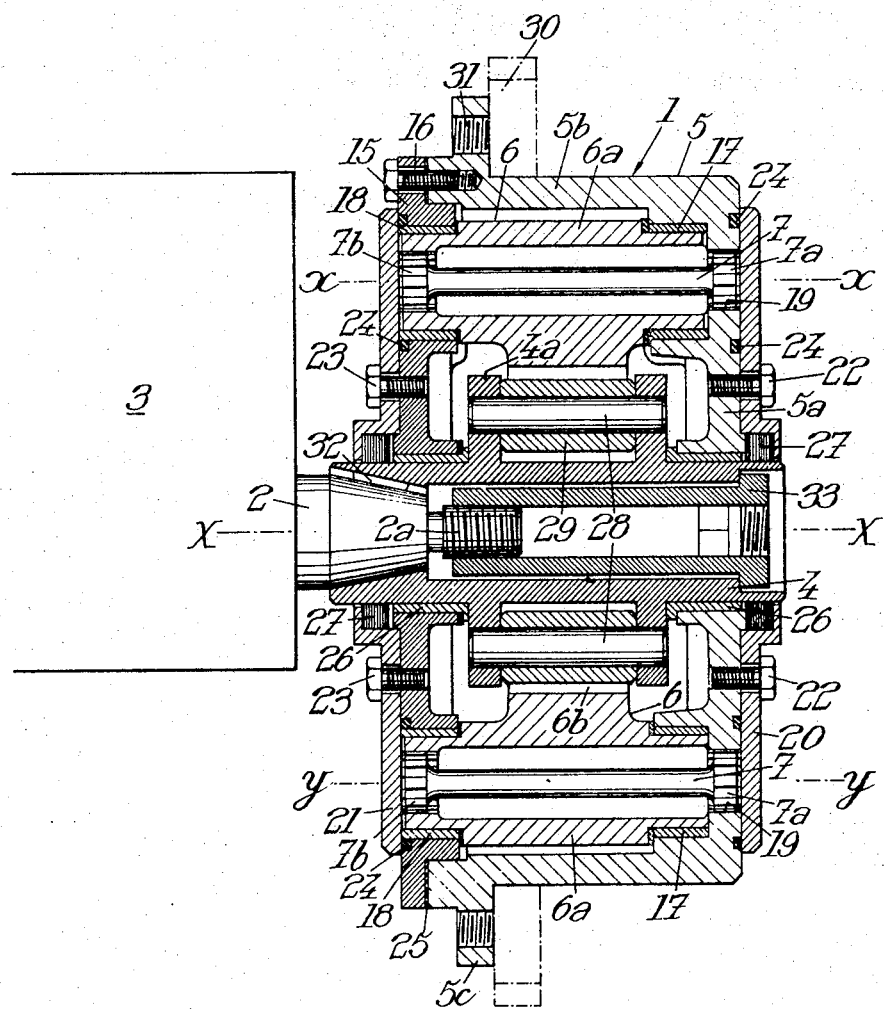

In the drawings:

FIGS. 1 and 2 show, respectively from the front with portions removed and in axial section along the line II—II of FIG. 1, an embodiment of a centrifugal regulator constructed according to the invention.

In order to construct a centrifugal regulator 1 for interposition between the crankshaft of a Diesel engine (not shown) and the cam-shaft 2 of the injection pump 3 supplying this engine, procedure is as follows.

As regards the regulator, as a whole, it is constituted so that it causes the angular position of a driven rotary member 4 to vary progressively with respect to a coaxial drive rotary member 5, as a function of the speed of rotation of the latter and that its weights 6, preferably two in number, are arranged to turn on the member 5 around axes x—x and y—y parallel to the axis of rotation X—X of the regulator and are provided with individual return springs 7.

According to the invention, the regulator may comprise screw stop means enabling adjustment of the limiting angular positions of each of the weights 6, these means being constituted, in the embodiment shown, by two screws 8 and 9 borne by each weight and adapted to limit the angular movement of the latter, respectively towards the axis X—X and away from this axis. Each screw 8 and 9 is engaged in a threaded hole 10 or 11, which is formed in the weight 6, where it is retained by a lock-nut 12 and bears a hexagonal round head 13 or the like, this head enabling advancing or backing of the screw by means of a key and ensuring contact with a stop surface. The screw 8 borne by each weight to limit its angular movement towards the axis X—X cooperates with a stop surface 14 belonging to the neighboring weight, the geometric axis of this screw 8 and the axis of rotation x—x or y—y of the neighboring weights being substantially concurrent and perpendicular between themselves.

The return spring 7 of each weight is constituted by a torsion bar aligned with the axis of rotation x—x or y—y of this weight 6 and anchored by one end to this weight and by the other end to the rotary member 5. The latter forms part of a box which comprises, on one hand, a casing constituting this member 5 and having a transverse base 5a and a cylindrical part 5b and, on the other hand, a cover 15 held on the box by screws 16. The inner wall of the cylindrical part 5b constitutes the abovesaid stop surface for the screws 9.

Each weight 6 comprises a hollow cylindrical portion 6a, traversed by the torsion bar 7, and engaged inside bushes 17 and 18, the bush 17 being borne by the base 5a of the casing 5 and the opposite bush 18 by the cover 15.

The hollow cylindrical portions 6a are axially open, which enables each torsion bar to be anchored by one end 7a (to the right in FIG. 2) to the base 5a of the casing 5 which possesses for this purpose an anchoring housing 19. The other end 7b of the bars 7 is anchored inside the hollow cylindrical portion 6a. On each side of the bars 7, flanges 20 and 21 are fixed respectively to the base 5a of the casing 5 and to the cover 15 by screws 22 and 23, toric seals 24 ensuring fluid-tightness between each flange and the base 5a or the cover 15 and a flat seal 25 between the cylindrical portion 5b of the casing 5 and the cover 15. The free portion of each weight, i.e., that which is furthest from the cylindrical portion 6a and which bears the screw 8, is preferably arranged in front of this cylindrical portion, in the direction of rotation of the regulator shown diagrammatically by an arrow F (FIG. 1).

The driven rotary member 4 is constituted by a hollow hub which is mounted in bushes 26 borne respectively by the base 5a and by the cover 15 and which passes through the flanges 20 and 21 inside rotary seals 27 such as lip seals. The hub 4 has lugs 4a which bear, two by two, axles 28 on each of which can turn a block 29, of approximately square section, which slides in a groove 6b arranged on the inner face of each weight 6, so that the angular displacements of the weights around their respective axes x—x or y—y (in the bushes 17, 18) actuate relative angular displacements of the hub 4 with respect to the casing 5.

The casing 5 is driven by the Diesel engine through a gear 30 which is fixed to the cylindrical portion 5b of the casing 5 by means enabling adjustment of its angular position with respect to this portion. Such means can be constituted by screws which pass through arcuate slots arranged on the gear 30 and are engaged in threaded holes 31 arranged in a collar 5c forming a projection at the periphery of the cylindrical portion 5b. As for the driven member or hub 4, it can be connected to the cam-shaft 2 of the pump 3 fixed, on one hand, in rotation by a key 32 and, on the other hand, axially by a tubular nut 33 housed inside the hub 4, this nut 33 being screwed on the threaded end 2a of the shaft 2 thereby thrusting against the hub 4.

As a result of which, there is obtained a regulator of which the assembly and operation are as follows.

Firstly, in the workshop, the screws 8 are adjusted then the screws 9 on the regulator 1 in order to set respectively the minimal speed at which the regulator comes into action (i.e., at which the screws 8 commence to be separated from their respective stop surfaces 14) and the amplitude of the maximal relative angular displacement of the hub 4 with respect to the casing 5, then the internal space of the regulator is greased which is closed by flanges 20 and 21. This regulator then forms a self-contained assembly rendered fluid-tight by the seals 24, 25 and 27.

The assembly thus formed is then keyed on the shaft 2 of the regulator and the assembly of the regulator 1 and of the pump 3 is mounted on the engine by adjusting the angular displacement of the gear 30 with respect to the collar 5c of the casing 5.

When it is in operation, the engine drives the casing 5 in rotation (in the direction of the arrow F, FIG. 1) by the gear 30 and the casing 5 drives in its movement the weights 6 through the bushes 17. The rotary movement is then transmitted to the cam-shaft 2 of the pump through blocks 29, axles 28 and hub 4. The weights 6 have a shape such that, for a low speed of rotation, the opposing torque of the pump, resisting the drive torque, closes them by acting on the latter through the blocks 29. There is then, between the casing 5 and the hub 4, an angular displacement corresponding to the injection lead angle which is suitable for low speeds.

Above a certain rotary speed (determined, as a function of the characteristics of the torsion bars 7, by the pretorsion which is imparted to them by the screws 8), the weights, under the action of centrifugal force, separate from their initial position thereby driving the axles 28 and the shoes 29, which modifies the relative angular position between the casing 5 and the hub 4 and, consequently, the injection timing. The position of the weights 6 is, for each speed, an equilibrium position under the effect of the centrifugal force and of the return torque exerted by the torsion bars 7. Due to the fact that these bars are not subject to any friction in their operation, contrary to the case of conventional springs (especially spiral springs), they do not cause any hysteresis, i.e., the lead angle takes the same value at a given speed, whether this speed is reached during acceleration or during deceleration.

The desired correction can be obtained by varying the diameter of the torsion bars 7, their pretorsion (by adjusting screws 8) and the amplitude of the correction (by adjusting screws 9). Frictional effects are reduced to the minimum by the selection which has been made of the return device for the weights (torsion bars) and, if necessary, by the nature of the bushes 17, 18 and 26 (self-lubricating metal resistant of heavy loads).

As is self-evident and as already emerges from the preceding description, the invention is in no way limited to those of its methods of application, nor to those of its methods of production of its various parts, which have been more especially indicated; it encompasses, on the contrary, all variations.

I claim:

1. Centrifugal regulator adapted for progressively varying the angular position of a driven rotary member with respect to a coaxial drive rotary member as a function of the rotary speed of said drive member, said regulator comprising weights arranged to pivot on said drive member around axes parallel to the axis of rotation of the regulator, said weights being provided with individual return springs, each said return spring being constituted by a torsion bar anchored at one end to the corresponding weight and at the other end to said rotary drive member and passing axially through a hollow portion of said weight, said hollow portion of each weight being cylindrical, a casing forming part of the rotary drive member and having transverse walls, two bushes borne by said transverse walls respectively of the casing, each said weight being engaged in two said bushes, the corresponding torsion bar being anchored at one end in an anchoring housing formed in one of the transverse walls and at the other end inside said cylindrical hollow portion, said driven rotary member including a hollow hub possessing external connecting means for said weights and passing outside the transverse walls of the casing through said bushes, and rotary seals sealing said hub at said walls.

2. Centrifugal regulator according to claim 1, wherein said screw stop means are constituted by two screws borne by each weight and adapted to limit the angular movement of the latter, respectively towards the axis of rotation of the regulator and away from said axis.

3. Centrifugal regulator according to claim 2, wherein the screw borne by one weight to limit its angular movement towards the axis of rotation of the regulator cooperates by abutment with the neighboring weight.

4. Centrifugal regulator according to claim 2, wherein the return spring of each weight is constituted by a torsion bar aligned with the axis of rotation of said weight and anchored by one end to the latter and by the other end to said drive rotary member.

5. Centrifugal regulator according to claim 3, wherein the return spring of each weight is constituted by a torsion bar aligned with the axis of rotation of said weight and anchored by one end to the latter and by the other end to said drive rotary member.

6. In a Diesel engine comprising a fuel injection pump, a cam-shaft of said pump, and a crankshaft, a regulator according to claim 1, interposed between said crankshaft and said cam-shaft to modify their mutual angular relationship as a function of speed.

* * * * *